United States Patent [19]

Sigety, Jr.

[11] Patent Number: 4,584,634

[45] Date of Patent: Apr. 22, 1986

[54] SUPPORT DEVICE FOR A VEHICLE HEADLAMP

[75] Inventor: Stephen Sigety, Jr., Mt. Clemens, Mich.

[73] Assignee: General Motors Corporation, Detroit, Mich.

[21] Appl. No.: 670,496

[22] Filed: Nov. 13, 1984

[51] Int. Cl.$^4$ .............................................. F21V 21/28
[52] U.S. Cl. ..................................... 362/275; 362/289
[58] Field of Search ................... 362/275, 273, 80, 83, 362/287, 288, 289, 368, 396, 418, 428; 313/113

[56] References Cited

U.S. PATENT DOCUMENTS

| 4,343,031 | 8/1982 | Liebegott | 362/289 |
| 4,414,614 | 11/1983 | McMahan | 362/289 |
| 4,415,956 | 11/1983 | McMahan | 362/289 |

Primary Examiner—Ronald H. Lazarus
Attorney, Agent, or Firm—Edward J. Biskup

[57] ABSTRACT

A support device for a vehicle headlamp that includes a ring-like retainer member having three spaced rearwardly extending arms each of which is provided with a spring clip for contacting and maintaining the headlamp within the retainer member.

3 Claims, 4 Drawing Figures

SUPPORT DEVICE FOR A VEHICLE HEADLAMP

This invention relates to vehicle headlamps and more particularly to a support device for a headlamp that provides adjustable aiming movement of the headlamp relative to the vehicle.

My copending patent application Ser. No. 543,610 entitled, "Support Device for a Vehicle Headlamp" and filed on Oct. 20, 1983, now U.S. Pat. No. 4,491,901 discloses a support device for a vehicle headlamp that consists of a single strand of wire shaped in a zigzag fashion so as to have a gripping engagement with a front and rear peripheral portion of the headlamp for supporting the latter, and includes three loop-shaped sections which carry adjusting screws that serve to connect the support device to the vehicle. The support device according to the present invention is similar to the device disclosed in the aforementioned application but differs therefrom in that a sheet metal retainer in the form of a ring cooperates with a spring clip arrangement for providing a gripping engagement with the peripheral portion of the headlamp. In addition, rather than using looped-shaped sections of wire for connecting the retainer to the vehicle, three rearwardly extending sheet metal arms are provided, each of which carries an adjusting screw for adjustably aiming the headlamp.

In the preferred form, the support device according to the present invention is attachable to the frontal portion of the vehicle and is adapted to support and provide adjustable aiming movement of the headlamp which is formed with a radially extending flange surrounding the headlamp adjacent the lens thereof; such flange being defined by an end wall and substantially parallel front and rear walls each of which lies in a plane substantially perpendicular to the optical axis of the headlamp and the end wall. The support device is characterized in that it includes a ring-like retainer member of substantially uniform Z-shaped cross section encompassing the flange of the headlamp with one portion of the retainer member being located adjacent the front wall of the flange and another portion of the retainer member being located adjacent the end wall of the flange. A pair of arms are integrally formed with the retainer member on opposite sides of the headlamp along a horizontal axis passing through the geometric center of the headlamp and a third arm is integrally formed with the retainer member along a vertical axis which also passes through the geometric center of the headlamp. Each of the arms carries a spring clip member which is adapted to contact the rear wall of the flange of the headlamp so that a three point biasing force is provided that maintains the headlamp firmly within the retainer member. In addition, an adjusting screw is carried by the free end of each of the three arms that is adapted to be threadably received by the vehicle for adjusting the aim of the headlamp.

A more complete understanding of the invention can be derived from the following detailed description when taken in conjunction with the drawings in which.

Figure 2:
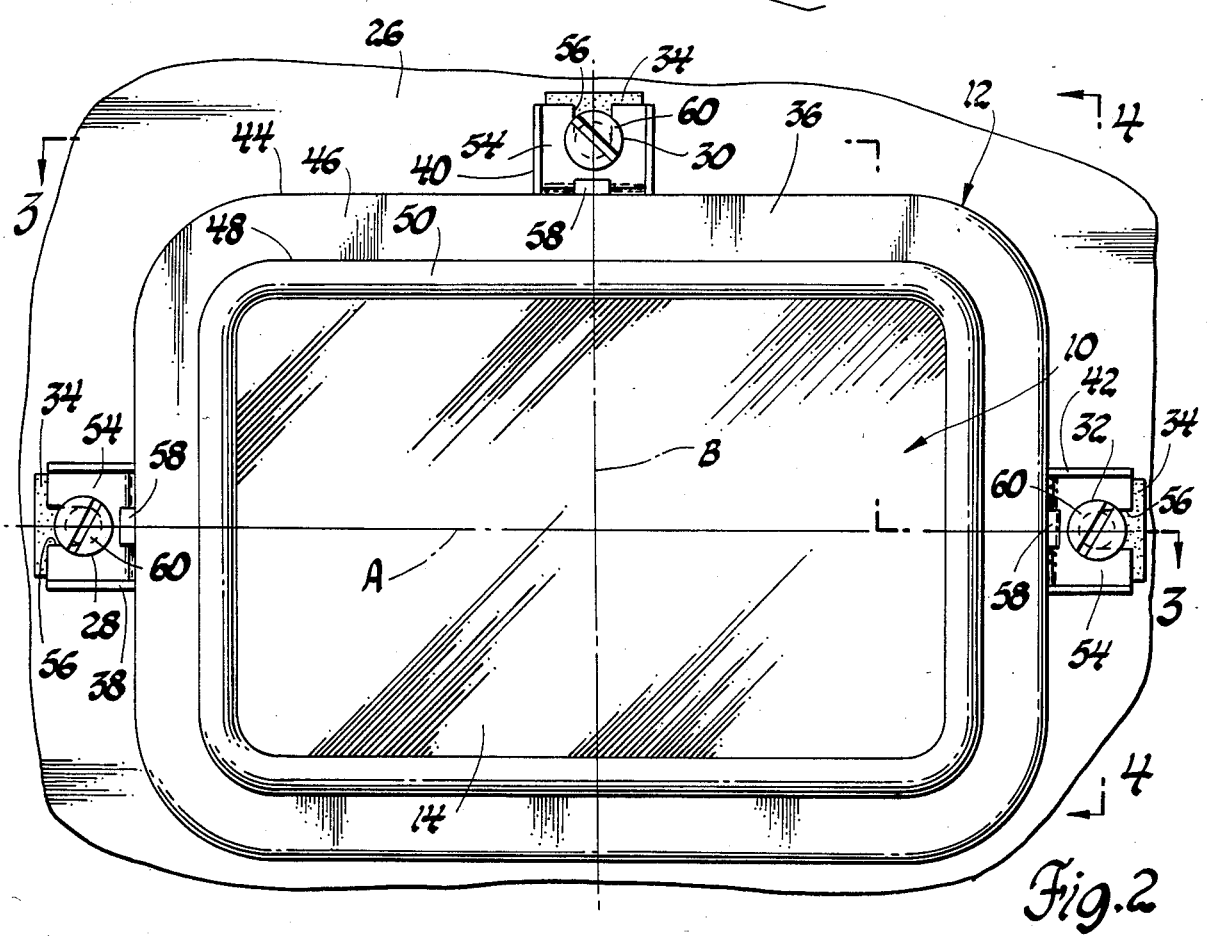
FIG. 2 is a front elevational view showing the headlamp mounted in and supported by the support device of FIG. 1.
Figure 3:
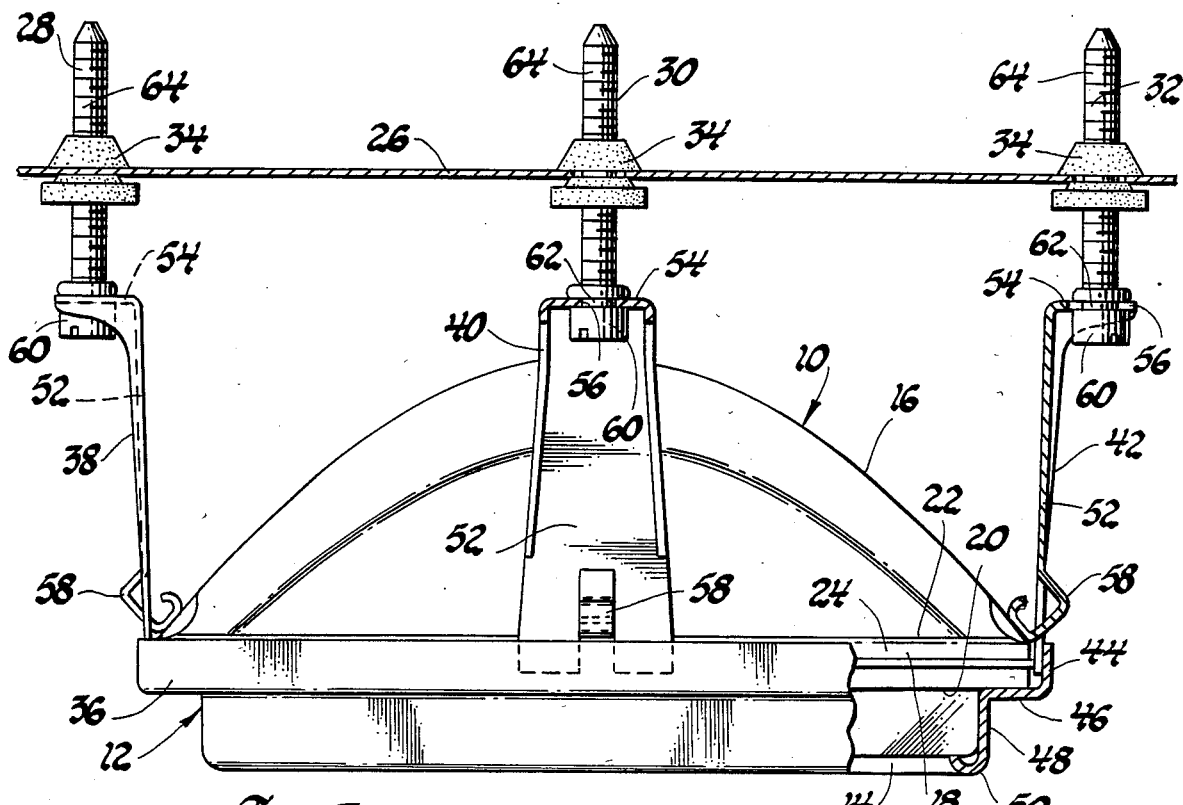
FIG. 3 is a plan view taken on line 3—3 of FIG. 2 showing the top portion of the support device.
Figure 4:
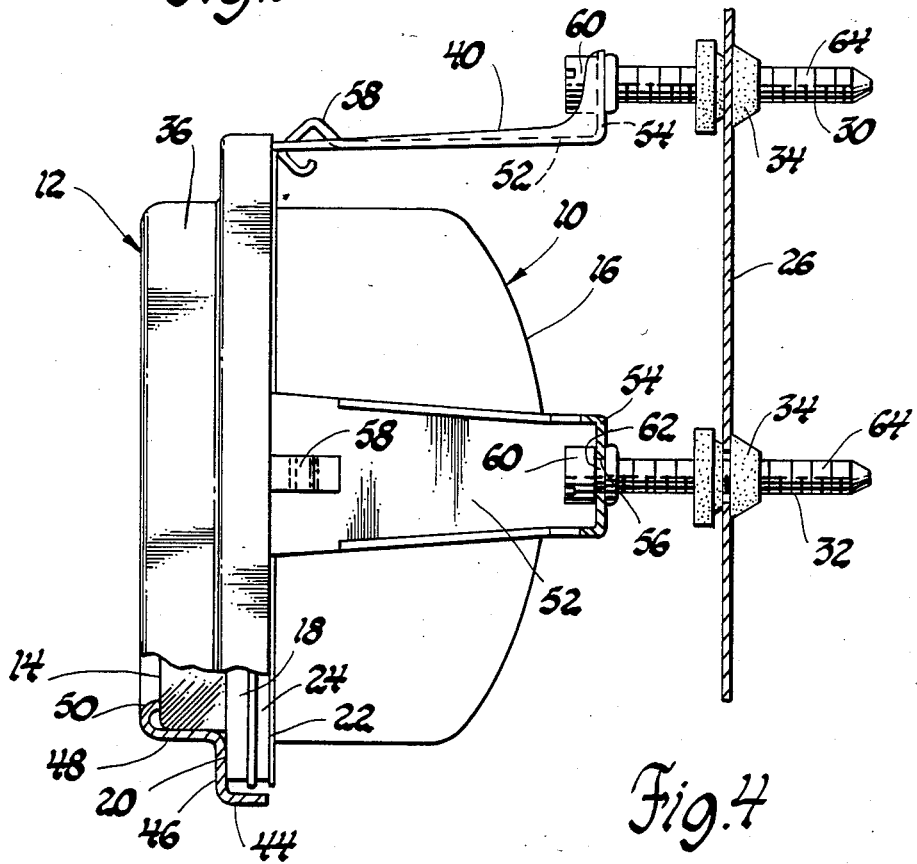
FIG. 4 is a side elevational view of the support device taken on line 4—4 of FIG. 2.

Referring to the drawings, and more particularly FIGS. 2 through 4 thereof, a rectangular headlamp 10 is shown mounted within a support device 12 made in accordance with the present invention. As seen in FIG. 2, the headlamp 10 includes the usual lens 14 and a reflector 16 bonded together so as to provide a radially extending peripheral flange 18 which is of uniform cross section and surrounds the frontal portion of the headlamp 10. The flange extends along the top of the headlamp 10 as well as along each side thereof, and also along the bottom of the headlamp 10. The top, both sides, and bottom portion of the flange in each instance, is defined by a front wall 20 and a parallel rear wall 22 interconnected by an end wall 24 that is perpendicular to the front and rear walls 20 and 22. The support device 12 serves to connect the headlamp 10 to the front sheet metal 26 of a vehicle through three identical adjusting screws 28, 30, 32 each of which is threadably received by an identical plastic nut 34 mounted in the sheet metal 26. Thus, when rotated about its longitudinal center axis, each screw 28, 30, 32 will cause movement of the headlamp 10 so that desired aiming thereof can be achieved.

Figure 1:
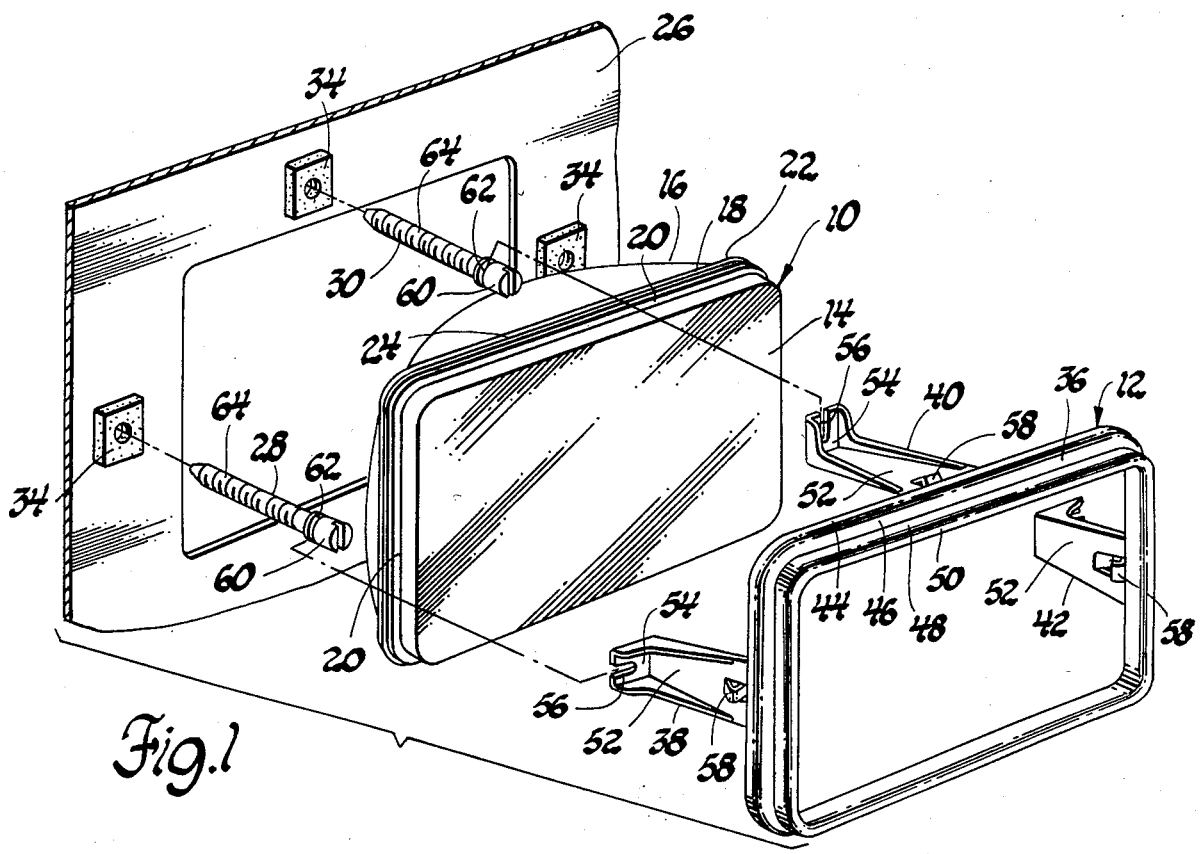
FIG. 1 is an exploded view showing the support device made according to the present invention and a vehicle headlamp.

More specifically, the support device 12 comprises a ring-like retainer member 36 which is adapted to encompass the aforementioned flange of the headlamp and has three identical arms 38, 40, and 42 that extend rearwardly and receive the adjusting screws 28, 30, and 32 respectively. As seen in FIG. 1, the retainer member 36 is generally rectangular in configuration and includes parallel and vertically spaced top and bottom wall sections which are integrally formed with a pair of parallel and horizontally spaced side wall sections. As seen in FIG. 2, the arms 38 and 42 are respectively connected to the side wall sections of the retainer member along a horizontal axis A which passes through the geometric center of the headlamp 10, while the arm 40 is connected to the top wall section of the retainer member along a vertical axis B which intersects the axis A at the aforementioned geometric center. Each of the wall sections of the retainer member 36 has the same Z-shaped cross sectional configuration and, as seen in FIG. 3 and FIG. 4, comprises three leg portions 44, 46 and 48. The free end of leg portion 48 terminates with a reversely bent rim 50 which, as seen in FIGS. 3 and 4, contacts the frontal portion of the lens 14.

As described above, the arms 38, 40 and 42 are rigidly connected to the side wall sections and the top wall section of the retainer member 36. In this regard, it will be noted that each arm 38, 40 and 42 is a sheet metal stamping that includes a planar body portion 52 the rear end of which is integral with a perpendicular end plate 54 formed with a slot 56 for receiving one of the adjusting screws 28, 30, 32. Also, the front end of each arm 38, 40 and 42 connected to the associated wall section of the retainer member 36 is formed with an integral J-shaped clip 58 which serves as a spring member which contacts the rear wall 22 of the flange 18 for biasing the latter into contact with the leg portion 46 of the associated wall section of the retainer member 36. Thus, the headlamp 10 is firmly located and maintained within the retainer member 36 by a three point biasing force provided by the clips 58 of the arms 38, 40 and 42.

Each adjusting screw 28, 30, 32 associated with arms 38, 40, 42, respectively, is of the conventional type having a head 60 formed with a reduced diameter portion or neck 62 which is received by the slot 56 in the end plate 54 and is rotatable therein. Also, the shank portion 64 of each screw 28, 30, 32 is formed with threads so when the support device 12 is connected to the sheet metal portion 26 of the vehicle, as seen in FIGS. 2, 3, and 4, the headlamp 10 maintains its aimed position. If the headlamp 10 subsequently requires reaiming, the adjusting screws 28, 30, 32 can be independently rotated in the usual manner to provide the desired aim of the headlamp 10.

Various changes and modifications can be made in this construction without departing from the spirit of the invention. Such changes are contemplated by the inventor and he does not wish to be limited except by the scope of the appended claims.

The embodiments of the invention in which an exclusive property or privilege is claimed are defined as follows:

1. A support device attachable to a vehicle body at the front end thereof and adapted to support and provide adjustable aiming movement of a headlamp formed with a radially extending flange surrounding the headlamp adjacent the lens thereof, said flange being defined by an end wall and substantially parallel front and rear walls each of which lies in a plane substantially perpendicular to the optical axis of said headlamp and intersects said end wall, said support device comprising a ring-like retainer member encompassing said flange and having a uniform Z-shaped cross section one leg of which is located adjacent said front wall of said flange and another leg of which is located adjacent said end wall of said flange, a pair of arms connected at one end to said retainer member and located along a first axis passing through the geometric center of said headlamp and being perpendicular to said optical axis, a third arm connected to said retainer member and located along a second axis passing through said geometric center of said headlamp and being perpendicular to both said optical axis and said first axis, each of said arms having said one end thereof formed with a spring clip member which is adapted to contact said rear wall of said flange and cooperate with said retainer member to maintain said flange firmly within said retainer member and an adjusting screw carried by the other end of each of said three arms and adapted to be threadably received by said vehicle for adjusting the aim of said headlamp.

2. A support device attachable to a vehicle body at the front end thereof and adapted to support and provide adjustable aiming movement of a headlamp formed with a radially extending flange surrounding the headlamp adjacent the lens thereof, said flange being defined by an end wall and substantially parallel front and rear walls each of which lies in a plane substantially perpendicular to the optical axis of said headlamp and intersects said end wall, said support device comprising a ring-like retainer member encompassing said flange and having a uniform Z-shaped cross section one leg of which is located adjacent said front wall of said flange and another leg of which is located adjacent said end wall of said flange, a pair of arms connected at one end to said retainer member and located along a horizontal axis passing through the geometric center of said headlamp, a third arm connected to said retainer member and located along a second vertical axis passing through said geometric center of said headlamp, each of said arms having said one end thereof formed with a spring clip member which is adapted to contact said rear wall of said flange and cooperate with said retainer member to maintain said flange firmly within said retainer member, and an adjusting screw carried by the other end of each of said three arms and adapted to be threadably received by said vehicle for adjusting the aim of said headlamp.

3. A support device attachable to a vehicle body at the front end thereof and adapted to support and provide adjustable aiming movement of a headlamp formed with a radially extending flange surrounding the headlamp adjacent the lens thereof, said flange being defined by an end wall and substantially parallel front and rear walls each of which lies in a plane substantially perpendicular to the optical axis of said headlamp and intersects said end wall, said support device comprising a rectangular retainer member encompassing said flange and having four wall sections of uniform Z-shaped cross section, each of said wall sections having one leg thereof located adjacent said front wall of said flange and another leg thereof located adjacent said end wall of said flange, a pair of arms connected at one end to said retainer member and located along a horizontal axis passing through the geometric center of said headlamp, a third arm connected to said retainer member and located along a vertical axis passing through said geometric center of said headlamp, each of said arms having said one end thereof formed with a spring clip member which is adapted to contact said rear wall of said flange and provide a three point biasing force for maintaining said headlamp firmly within said retainer member, and an adjusting screw carried by the other end of each of said three arms and adapted to be threadably received by said vehicle for adjusting the aim of said headlamp.

* * * * *